United States Patent [19]

Hockensmith et al.

[11] 4,154,788

[45] May 15, 1979

[54] PROCESS FOR MAKING A PLASTIC ANTENNA REFLECTOR

[75] Inventors: Richard P. Hockensmith, Seabrook; Elmer E. Skelton, Silver Spring; Daniel L. Thomas, Westminister, all of Md.

[73] Assignee: The United States of America as represented by the Secretary of the Navy, Washington, D.C.

[21] Appl. No.: 311,172

[22] Filed: Dec. 1, 1972

Related U.S. Application Data

[63] Continuation-in-part of Ser. No. 124,893, Mar. 16, 1971, abandoned.

[51] Int. Cl.$^2$ ........................ B29C 17/04; B29C 17/08

[52] U.S. Cl. .................................... 264/554; 264/129; 264/139; 264/154; 264/292

[58] Field of Search ....................... 264/89, 90, 92, 93, 264/94, 292, 320, 322, 104, 129, 139, 154, 162; 343/910–912; 117/8

[56] References Cited

U.S. PATENT DOCUMENTS

| | | | |
|---|---|---|---|
| 2,490,548 | 12/1949 | Schultz | 117/8 |
| 3,119,109 | 1/1964 | Miller et al. | 343/912 X |
| 3,189,907 | 6/1965 | Van Buskirk | 343/912 X |
| 3,207,821 | 9/1965 | Jones-Hinton et al. | 264/92 |
| 3,346,410 | 10/1967 | McCarthy | 117/8 |

*Primary Examiner*—Jan H. Silbaugh

*Attorney, Agent, or Firm*—R. S. Sciascia; Q. E. Hodges

[57] ABSTRACT

This invention is a method for forming an antenna reflector and housing from a plastic material, rather than from metal or a glass/cloth laminate. The method comprises the steps of scribing a grid structure on a plastic sheet; vacuum or gavity forming the plastic sheet and trimming it to size; coating the plastic sheet with a conductive metal such as copper; and then removing the excess copper from the antenna. Alternatively, a printing and etching technique can be used in substitution of the scribing coating steps.

6 Claims, 6 Drawing Figures

INVENTORS
RICHARD P. HOCKENSMITH
ELMER E. SKELTON
BY DANIEL L. THOMAS

ATTORNEY

PROCESS FOR MAKING A PLASTIC ANTENNA REFLECTOR

This is a continuation-in-part of application Ser. No. 124,893 filed Mar. 16, 1971, now abandoned.

This invention relates generally to radio frequency structures and the process for constructing the same; more particularly it relates to a metalized plastic material for radio frequency devices and the process of constructing the same. Still more particularly, the invention relates to a process to precisely and efficiently form a radio frequency antenna reflector and housing such as a Cassegrain type reflector. The method of this invention is directed to the structure of the reflector and is not directed nor limited to the precise radar pattern reflected.

A Cassegrain antenna reflector is defined in the "Modern Dictionary of Electronics," by Rudolf S. Graf, Howard W. Sands & Company, Inc., the Bobbs-Merrill Company, Inc., Indianapolis, Kansas City, N.Y., 1970. As defined it is a reflecting antenna with the feed position near the vertex of the reflector and with a small sub-reflector placed near the focal point. The feed and sub-reflector illuminate the main reflector which forms a radiated beam or pattern and the shapes of the sub-reflector and main reflector are so chosen that the secondary rays from the main reflector emerge parallel to the main reflector axis. The structures and methods for producing reflectors in radar antennas are well known in the art. The structure of the reflector and the dimensions of the reflector are available to one skilled in the art and are provided in the "Antenna Engineering Handbook" by Henry Jasik, First Edition, Rawhill, New York, N.Y., 1961, pages 32-11 to 32-16.

It has been a problem to precisely and efficiently form the radio frequency reflecting surface of an antenna within strict electrical tolerances. One prior method has been a spinning technique whereby the mold and the metal were rotated rapidly and simultaneously and mechanical pressure is applied to the metal for forming the proper curvature. Another method was to form the metal while stretching the same over a mold. The objection to these methods was the tendency of the antenna structure after being formed to contract due to the resiliency of the metal. Consequently, it was extremely difficult and often impossible to control the antenna characteristics to the narrow tolerances required. Hence, these methods are not suitable to form antennas for radio frequency devices which require precise reproduction of the mold curvature representing the radio frequency reflecting surface.

SUMMARY OF THE INVENTION

The method of this invention involves the application of a thermo-plastic, such as Lexan, for the reflective base material. The dimensions of the reflector are held to a close tolerance by vacuum or gravity forming over a forming tool. Vacuum forming a thermo-plastic over a mold is well known in the art. The thermo-plastic sheet need merely be heated, to make it moldable and then formed over the mold and cooled so it retains its molded shape.

This invention is directed toward forming an antenna reflector from a thermo-plastic material which is not heretofore known. The advantage of using a thermo-plastic material is that the reflector may be formed over the mold in one step whereas other materials, for example fiberglass, require a two step method of forming the fiberglass sheets over the mold, dopping the fiberglass sheets with resin, and then permitting the resin to harden.

This plastic formed antenna reflector has many significant advantages over a spun metal reflector and/or glass-cloth reflectors when the reflector size is on the order of two feet or less, in the cross-sectional dimension.

In the process of forming this antenna, a grid structure is scribed on a flat sheet of thermo-plastic and the plastic is vacuum formed or gravity formed over a forming tool. The scribed surface is then coated with a conducting metal, such as copper, to the desired thickness, usually in the order of one mil. The copper between the scribed grid is then removed by sanding or a similar abrasive process which results in a particular arrangement of conductive strips. The structure can then be sprayed with an anti-oxidizing low loss plastic as an insulator and completed by adding the support structure and feed horn to the reflector.

It is well known in the art that conductive material will reflect radio energy at microwave frequencies. The particular arrangement of strips of the conductive material would be dependent upon the pattern which was desired from the reflector. Therefore, it is not deemed necessary to so describe the arrangement of these constructive strips in detail.

As an alternative process, the step involving scribing the grid structure on the flat sheet of plastic can be omitted and a printing and etching technique can be substituted therefore. The printing and etching step would then be done after the plastic was formed over the forming tool and prior to completing the structure by spraying the antenna with an anti-oxidized and low loss plastic spray as an insulator.

The advantages of this antenna to the antennas of the prior art is that the cost of production is less; the process is ideal for producing Cassegrain type reflectors; the reflectors can be easily sealed and thus made impervious to the environment; the reflector will not be permanently deformed if struck by a foreign object; it is easy to form reflectors of shaped contours which are not necessarily symmetrical; and the antenna housing and support structures can be formed for some reflector types during the same operation.

Accordingly, one object of this invention is a method for forming antenna reflectors and housings from plastic material rather than metal and/or glass-cloth laminate.

A second object of this invention is a method for forming Cassegrain antenna reflectors and housings, for operation in the X, $K_u$ or $K_a$ frequency bands, separately or in unison when the reflector plastic is one-half wavelength thick or less than 1/16 wavelength (thin-wall) at the operation frequency or frequencies.

A third object of this invention is a method for forming a precisely dimensioned antenna reflecting surface when the reflector size is on the order of two feet or less in its cross-sectional dimension.

A fourth object of this invention is a method of forming antenna reflectors at a reduced cost.

DESCRIPTION OF THE PREFERRED EMBODIMENT

The method of forming the antenna will now be described in reference to FIGS. 1, 2, 3 and 5.

Figure 1:
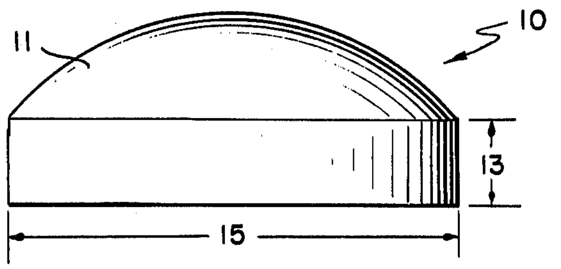
FIG. 1 shows in perspective, a forming tool over which the thermo-plastic may be molded to its desired shape.

The first step is the design of the electrical/mechanical parameters to meet the specific requirements of the antenna. Second a thermo-plastic forming tool is made as shown in FIG. 1, designated generally as numeral 10. The forming tool has a convex surface 11 which is machined to the desired contour of the completed antenna. These side dimension 13 and cross-sectional diameter can be any dimensions suitable to rhe particular design of the antenna. Third, a flat sheet of plastic, such as Lexan (a polycarbonate plastic material produced by the General Electric Company), is then machined so that a grid structure is scribed on the plastic. A hole may be drilled on the plastic for use as a reference point, corresponding to a matching reference point on the forming tool, so that the desired contour is achieved when the plastic sheet is formed over the forming tool 11.

Figure 2:
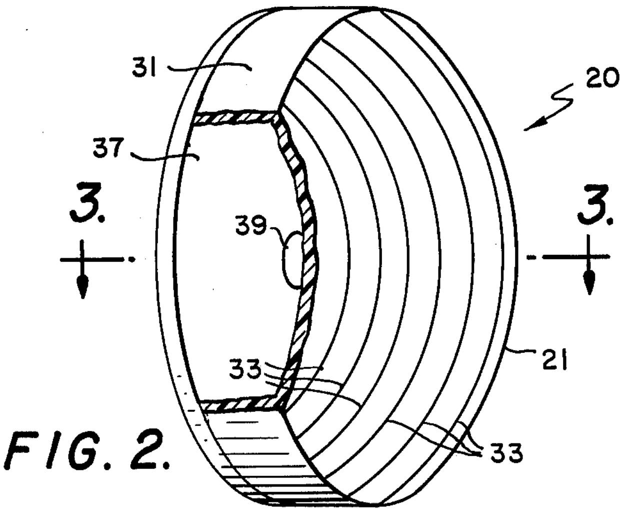
FIG. 2 shows in perspective, a partly exposed view of the finished antenna reflector.
Figure 3:
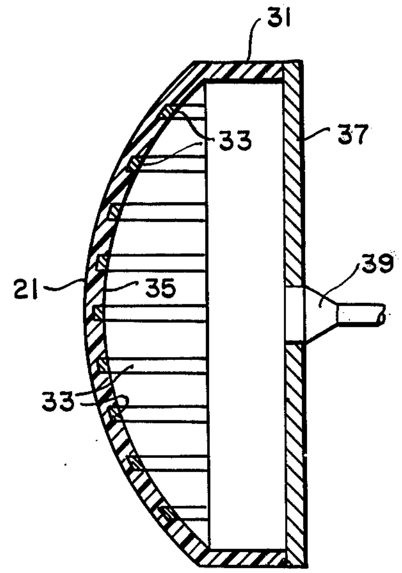
FIG. 3 shows the finished antenna of FIG. 2, in a sectional view along section line 3.

Fourth, the scribed plastic sheet designated 31 in FIGS. 2 and 3, is then vacuum formed or gravity formed over forming tool 11 and the plastic sheet is trimmed to size.

The formed plastic sheet may now be drilled for attaching the reflector to the antenna support structure or the reflector can be cemented to the support.

Fifth, the antenna reflector surface 35 is then coated with a conductive material, such as copper, to a designed thickness, usually 1 mil at the usable operating frequencies and copper between the scribed marks 33 is then removed from surface 35 using sanding or a similar abrasive process, leaving the conducting material only within scribed marks 33.

Sixth, the entire reflector structure may then be sprayed with anti-oxidizing low loss plastic spray to insulate the reflector from the environment if desired and then may be assembled onto an antenna structure 37 in which feed horn 39 is mounted.

The formed plastic antenna as shown in FIG. 2, and designated generally by numeral 20, is shaped to the contour of forming tool 10 with convex surface 21, formed to the shape of convex surface 11 of tool 10.

The formed antenna reflector, as shown in sectional view 3 comprises a layer of plastic material 31 having the contour of convex surface 11 and having machined scribed marks 33 filled with conductive material within surface 35 of the plastic sheet 31. The plastic sheet 31 may be one-half wavelength thick or less than 1/16 of a wavelength at the operating frequency or frequencies.

ALTERNATIVE METHOD

Figure 4:
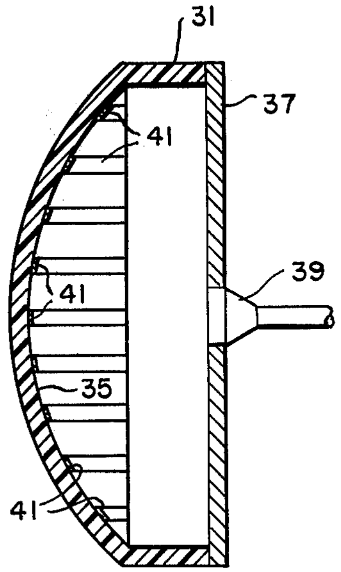
FIG. 4 shows the printed conductive grid of an alternative method.
Figure 5:
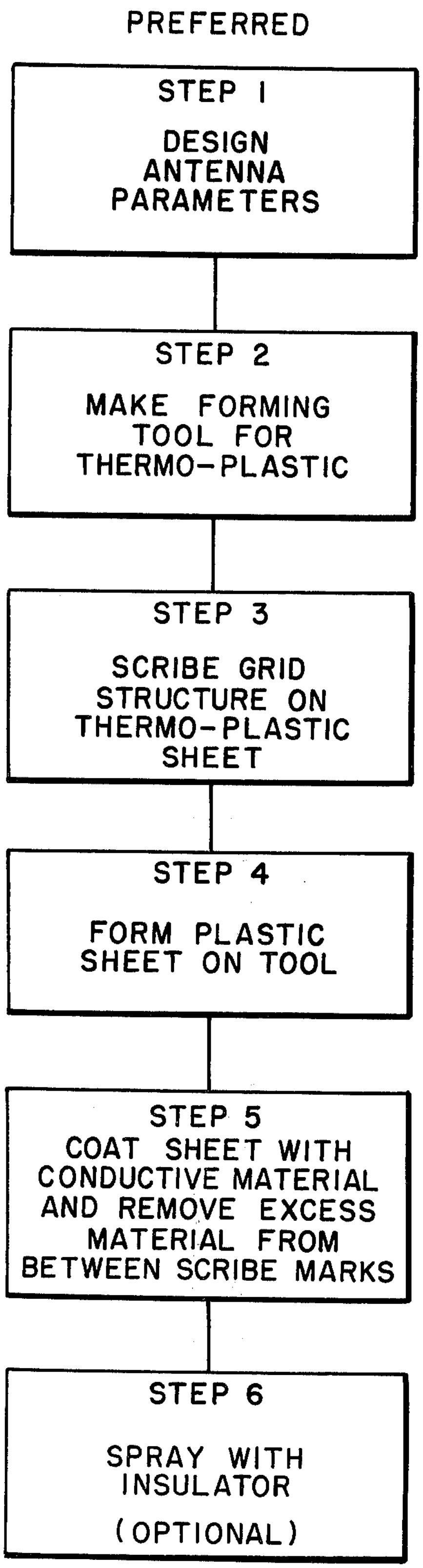
FIG. 5 diagrammatically shows the steps of the preferred method.
Figure 6:
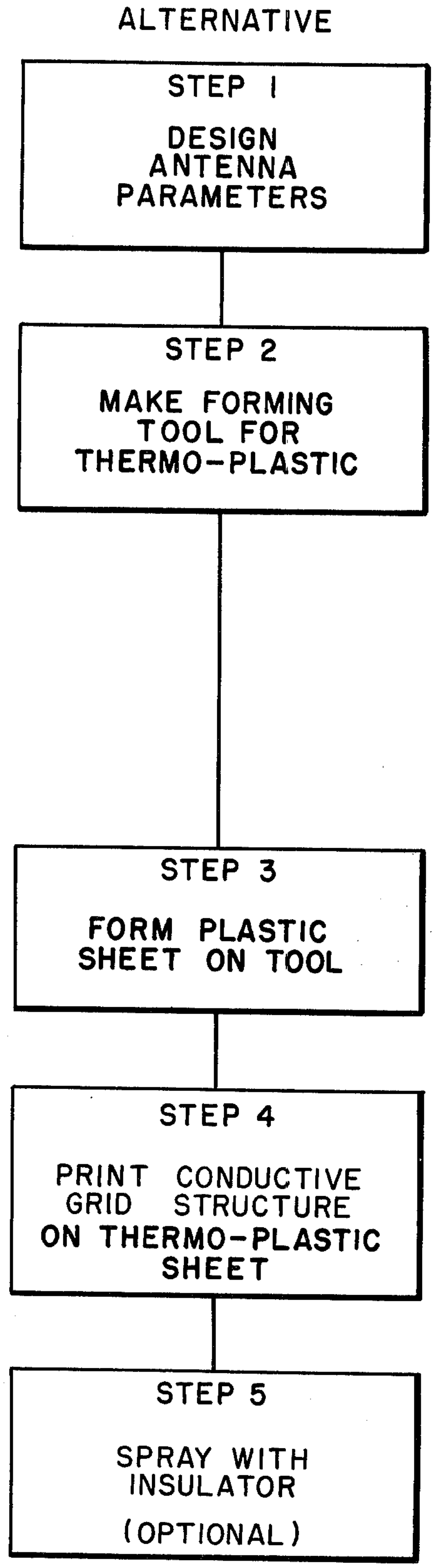
FIG. 6 diagrammatically shows the steps of the alternative method.

As an alternative method, the antenna would be formed as described in the description of the preferred embodiment. However, as the alternative embodiment uses the method of photo-engraving (printing and etching) as a substitute for the method steps of scribing a grid structure on a flat sheet of plastic and then coating a conductive material on the scribed surface and removing the copper between the scribe marks leaving conductive material in the scribed marks, steps 3 and 5 of the preferred method are replaced by step 4 of the alternative method, see FIGS. 5 and 6. Step 4 comprises the step of printing a conductive grid on surface 35 of plastic sheet 31 leaving a conductive grid structure as shown by numerals 41 on surface 35 of plastic sheet 31 shown in FIG. 4.

Printing and etching is a photo-engraving technique which is well known in the art and it is not felt to be necessary to go into the details of this photo-engraving technique in this application. In the alternative method, as in step 6 of the preferred method, the insulator may be applied to the entire reflector structure.

The antenna formed by the aforementioned process functions as a polarization grid. Energy polarized parallel to the grid is reflected while energy polarized perpendicular to the strip propagates through the reflector and out of the beam pattern. The reflector thickness must therefore either be less than 1/16 of a wavelength so that the dielectric acts like free space or, in the alternative, must be ½ wavelengths thick so that energy either propagates from it or through it with a minimum of energy cancellation. These conditions are as specified in the "Antenna Engineering Handbook" by Henry Jasik, First Edition, McGraw-Hill, New York, N.Y., 1961, pp. 32-11 to 32-16.

When the thickness of the reflector plastic 31 is one-half wavelength or less than 1/16 wavelength, the transmission losses are less than 0.2 db and the phase error across the total antenna aperature is negligably small for moderate curve reflectors ($f/D=0.03$). These design limits hold for Lexan thermo-plastic.

The forming process for Lexan thermo-plastic is fully explained in the publication "General Electric Lexan Polycarbonate Resins," Fabrication Data Section, pp. C-17 to C-25, published by Chemical Materials Department of General Electric, at 1 Plastics Avenue, Pittsfield, Mass., Apr. 1967.

Obviously many modifications and variations of the present invention are possible in the light of the above teachings. It is therefore to be understood that within the scope of the appended claims the invention may be practiced otherwise than as specifically described.

What is claimed is:

1. A method of forming an antenna reflector from thermo-plastic material comprising the steps of:
   - scribing a multiplicity of scribed grooves to form a grid structure on a flat sheet of thermo-plastic material;
   - forming the grooved portion of the thermo-plastic sheet to a desired three-dimensional shape and trimming said grooved sheet to size;
   - coating the scribed surface with a conductive material; and
   - removing the conductive material between the scribed grooves.

2. The method of claim 1, further including the step of spraying the formed plastic sheet with an anti-oxidizing low loss coating to insulate the antenna reflector from the environment.

3. The method of claim 1, wherein the step of forming includes vacuum forming the thermo-plastic sheet over a forming tool.

4. The method of claim 1, wherein the step of forming includes gravity forming the thermo-plastic sheet over a forming tool.

5. The method of claim 1, wherein said step of coating includes coating the scribed surface with a maximum thickness of one mil of conductive metal.

6. The method of claim 1, wherein said step of removing the conductive material between the scribed grid structure includes the step of abrasively removing the conductive material between the scribed grid structure lines.

* * * * *